May 11, 1954

O. P. DE LOE 2,678,115

SHOCK ABSORBER

Filed July 3, 1952

INVENTOR.
O. PAUL DELOE
BY
Robert A. Sloman
ATTORNEY.

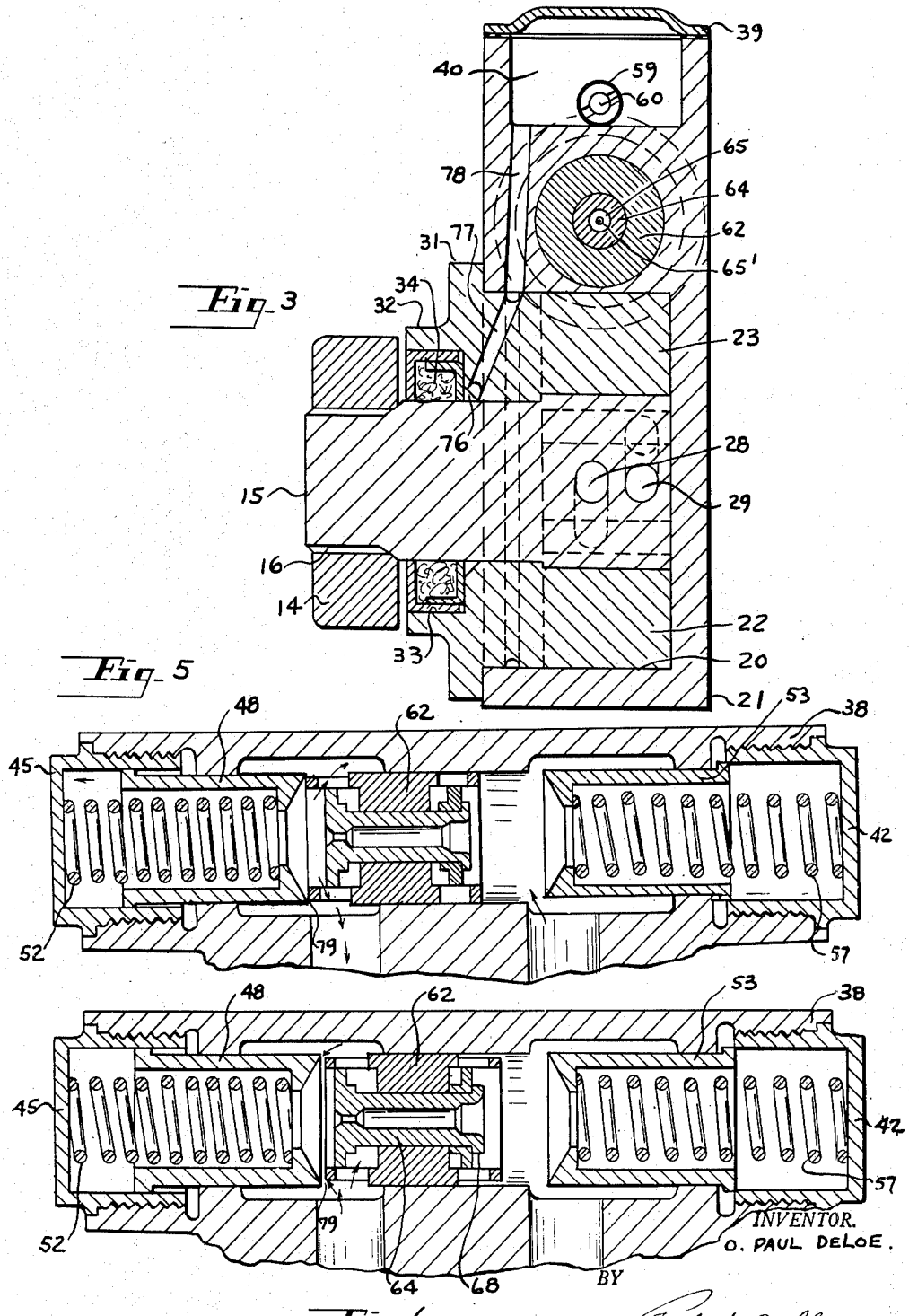

Patented May 11, 1954

2,678,115

UNITED STATES PATENT OFFICE 2,678,115

SHOCK ABSORBER

Oliver Paul De Loe, Detroit, Mich.

Application July 3, 1952, Serial No. 297,029

10 Claims. (Cl. 188—89)

This invention relates to shock absorbers and is a continuation in part of my copending patent application on a Shock Absorber, Serial Number 98,058, filed June 9, 1949, now United States Patent No. 2,605,861 dated August 5, 1952.

This present invention pertains to an improved shock absorber construction which is arranged in conjunction with the vehicle suspension so as to offer a minimum resistance to vehicle spring deflection away from equilibrium and will provide a decreasing resistance to recoil as the suspension returns to equilibrium.

Vehicle springs are normally compressed by gravity so that the spring lift of a particular vehicle spring suspension and gravity are in exact equilibrium, which is the starting point of all spring movements.

Movement away from equilibrium is opposed either up or down by progressively increasing but yielding force with a zero resistance at equilibrium.

As the vehicle moves over any road irregularly, the springs yield an amount determined by inertia. Thus the yielding is a concession to inertia more than to the road. But if the deflection is of sufficient duration the springs must accumulate sufficient strength to overcome inertia and deflect or turn the spring load as demanded by the road. This yielding and accumulating force in the springs absorbs a large portion of the force of inertia thus delaying the deflection and converting a rapid deflection into a more gentle curve.

When the accumulation of force by either springs or gravity has succeeded in deflecting the spring load so that it is again moving approximately parallel to the road, the full shock preventing function of the springs has been completed. This is accomplished effectively without any other force or restriction. Any resistance added to the accumulating resistance of either springs or gravity will be opposing inertia unnecessarily, hastening deflection and contributing to shock.

Equilibrium must be restored. But if the accumulated recoil force is permitted to make the return to equilibrium unchecked, it perpetuates deflection and sets up a series of oscillations, which are objectionable and frequently intensify subsequent deflections.

Recoil forces in springs are in direct proportion to the distance from equilibrium, determined by spring characteristics, and can be measured by the gain or loss in spring lift at any point. These recoil forces are progressively diminishing to zero at equilibrium. Consequently, resistance to recoil forces should also diminish as the recoil forces diminish with recoil forces retaining a sufficient balance of power to insure complete return to equilibrium.

The relationship between recoil forces and resistance in the control device must be maintained while the vehicle is in motion and be re-established to meet the new equilibrium when the number of passengers or amount of cargo is changed.

It is therefore the object of the present invention to provide an improved and correct control for the spring suspension which will offer a minimum of resistance to primary movement away from equilibrium so that the same is not unnecessarily opposed.

It is the further object of this invention to provide an improved shock absorber construction which will resist the recoil forces in proportion to the recoil forces but will permit complete return of the suspension to a point of equilibrium.

It is the further object of this invention to provide a decreasing resistance in the shock absorber corresponding to the diminishing recoil forces arriving at zero resistance to recoil slightly prior to equilibrium so that equilibrium will always have zero resistance.

It is the still further object of this invention to provide a hydraulic shock absorber which utilizes fluid displacement by the primary movement of the suspension from equilibrium to activate the resistance necessary to effectively restrict recoil, i. e. the forces seeking to return the suspension to equilibrium.

It is the further object of this invention to utilize this initial fluid displacement for determining the amount of loading on a spring loaded relief valve which is so designed that low fluid pressure will load the valve but would require a relatively high fluid pressure to open the valve.

These and other objects will be seen from the following specification and claims in conjunction with the appended drawings in which:

Fig. 3 is a section taken on line 3—3 of Fig. 1.

Fig. 5 is a similar view illustrating the relationship of the relief valve and other parts when the suspension is moving away from its position of equilibrium; and Fig. 6 is a similar view of the relief valve and parts in recoil resisting position.

It will be understood that the above drawings illustrate merely a preferred embodiment of the invention and that other embodiments are contemplated within the scope of the claims hereafter set forth.

Figure 1:
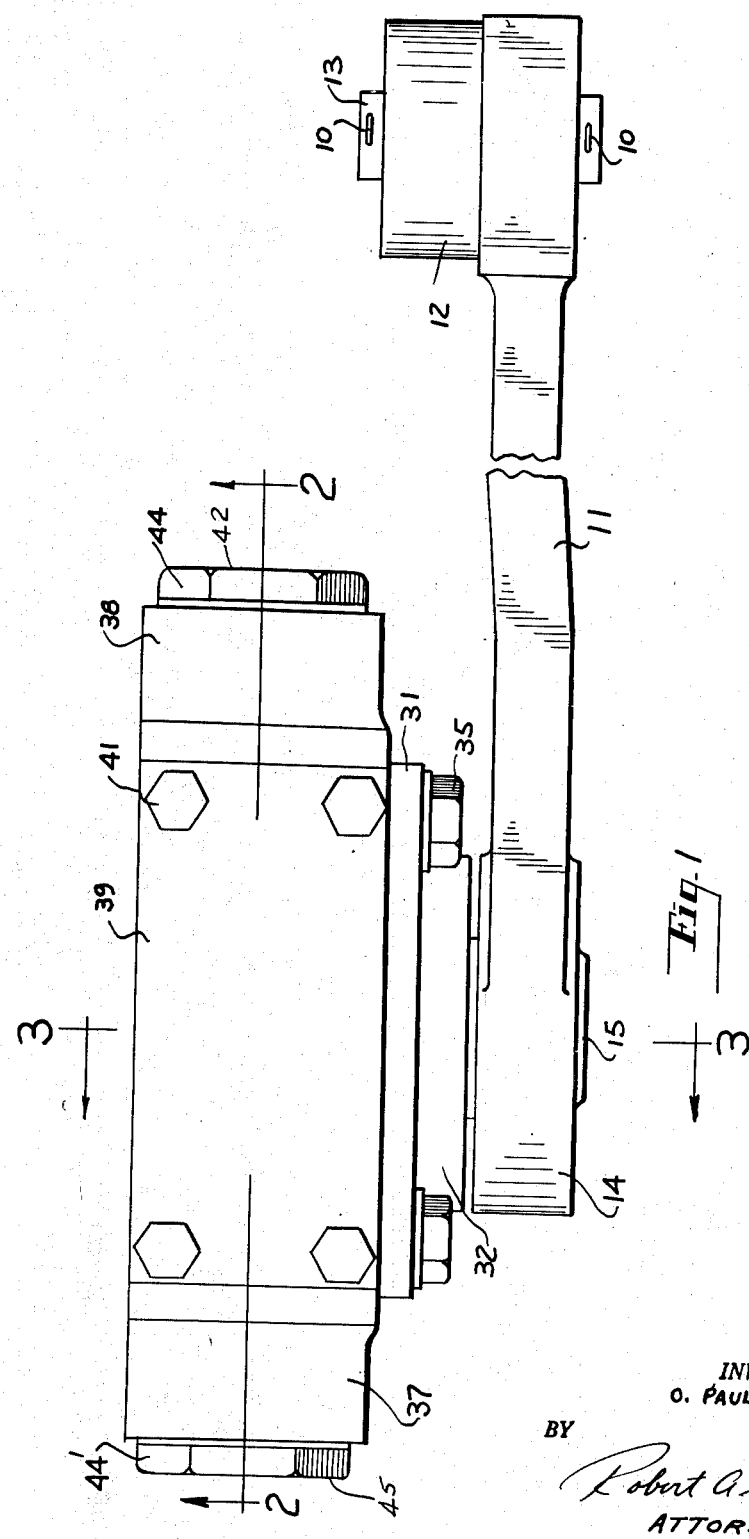
Fig. 1 is a top plan view of the shock absorber illustrating its connection fragmentarily with the vehicle spring suspension.

Referring to the drawings, in Fig. 1 there is shown a shock absorber operating lever 11 secured at its outer end to a portion of the vehicle suspension 12 by means of the transverse pin 13 and the cotter pins 10. The opposite end 14 of lever 11 is immovably secured over the splined or similarly formed outer end of the rocker shaft 15 which projects into shock absorber housing 21.

A pair of oppositely arranged sector shaped vanes 17 and 18 are arranged upon the inner end of shaft 15 and form a part thereof, their outer end surfaces being curved as at 19 for sliding engagement with the circular interior surface 20 of housing 21.

There are also provided within housing 21 in spaced relation to vanes 17 and 18, a pair of oppositely arranged similarly shaped stationary vanes 22 and 23 whose outer curved surfaces 30 snugly cooperate with the interior circular surface 20 of said housing, and thereby provide the four chambers 24, 25, 26 and 27 within said housing into and from which vanes 17 and 18 are adapted to move upon movements of the spring suspension from its position of equilibrium.

Figure 2:
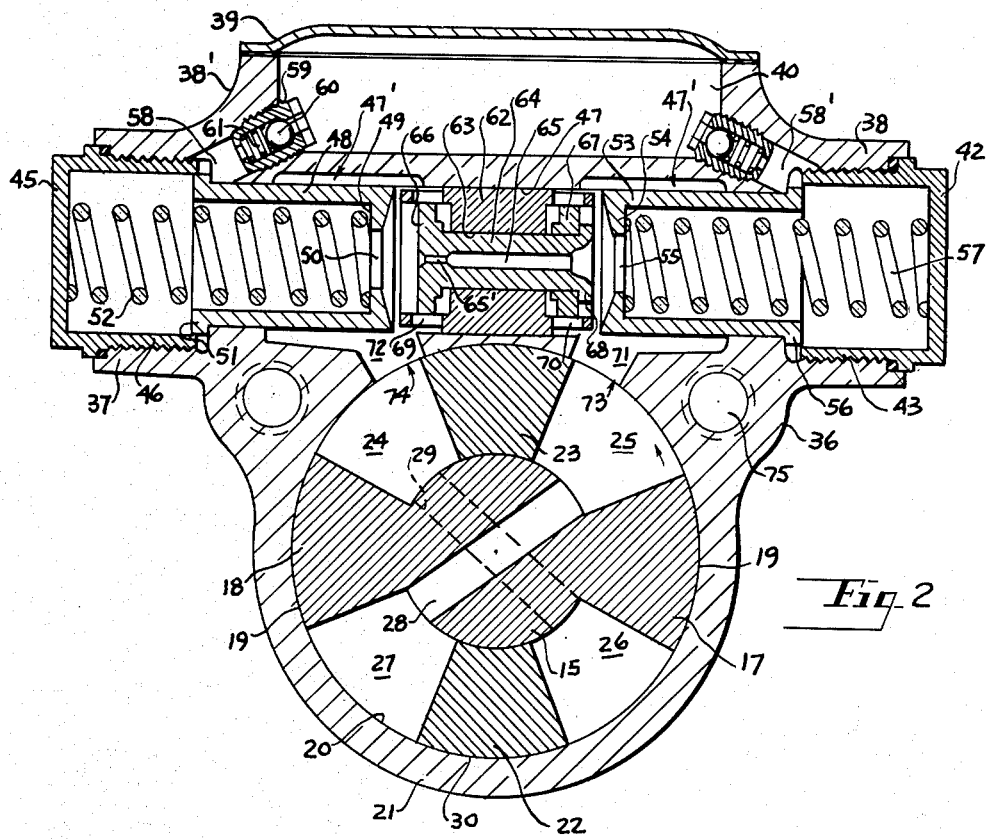
Fig. 2 is a section taken on line 2—2 of Fig. 1.

Referring to Fig. 2, chambers 25 and 27 are in communication with each other in view of the transverse passage 28 formed within the rock shaft 15 adjacent said vanes. Similarly, chambers 24 and 26 are interconnected by the second angularly related spaced passageway 29 formed in said rock shaft.

Referring to Figs. 2 and 3, the stationary vanes 22 and 23 positioned within housing 21 are secured upon one side of the circular plate 31 which has a hub 32 of reduced diameter, and within which is a circular recess 33 which houses the oil seal 34. Plate 31 is secured to housing 21 by the bolts 35 shown in Fig. 1.

Referring to Fig. 2, the upper portion 36 of housing 21 terminates in the interiorly threaded oppositely extending aligned portions 37 and 38. Housing element 36 terminates at its upper end in the hollow extension 38', which is provided with a cover 39 defining the fluid or oil reservoir 40, and is secured upon said housing by the bolts 41.

Cap 42 with annular exteriorly threaded portion 43 extends within housing extension 38 forming a closure therefore, and said cap is formed as a nut 44 as in Fig. 1, to permit its adjustment within said housing extension.

Similarly, there is a second closure cap 45 with circular exteriorly threaded extension 46 which threadedly engages within housing extension 37 and also has an exterior nut formation 44', as shown in Fig. 1.

The upper portion of the housing 20—36 has formed therethrough a central bore 47 in axial registry with caps 42 and 45 and the openings in housing extensions 37 and 38. Hollow piston 48 with end wall 49 and central aperture 50 is reciprocably positioned within the bore 47 upon one end thereof, and has an exterior shoulder 51 at its open end engageable with a portion of housing 36 for limiting the inward positioning thereof.

Coiled spring 52 is interposed between the interior of cap 45 and end wall 49 of piston 48 and normally maintaining the same in the position shown in Fig. 2.

There is also provided a second similarly shaped oppositely arranged piston 53, open at one end and having an end wall 54 at its other end, which is apertured at 55 and which is also reciprocal within bore 47. The piston 53 also has an exterior shoulder 56 at its open end which engages housing 36 limiting its inward positioning. A second coiled spring 57 is interposed between the interior of cap 42 and end wall 54 of piston 53 for normally maintaining said piston at its innermost position with respect to housing 36, as illustrated in Fig. 2.

Passages 58 and 58' extend at their one ends into reservoir 40 and at their opposite ends are in communication with bore 47. Ball check valves are arranged in said passages and include the fittings 59, the balls 60 normally closing off fluid communication through fittings 59, as well as the coiled springs 61 within said fittings which bear against said balls.

Slidably positioned centrally within bore 47 intermediate pistons 48 and 53 is a control piston 62 centrally apertured at 63 to slidably receive elongated check valve 64.

Said check valve has a central elongated passage 65 throughout substantially its length and terminates at its one end in passage 65' of reduced diameter, which is adapted to permit equalization of low fluid pressures within the interior of bores 47' when the device is held in any position, such as a position of equilibrium.

Control piston 62 also has formed therein at its opposite ends cylindrical openings within which circular plates 66 and 67 are slidably movable in unison with movements of check valve 64. It will be noted that the plate 66 forms an integral part of valve 64 upon one end thereof to facilitate assembly within control piston 62, and the second circular plate 67 is secured upon the outside of check valve 64 by the turning over as at 68 of the end portions of said check valve. Consequently, control piston 62 and the relatively movable check valve 64 with its circular end plates 66 and 67, together form a part of the control unit for operation in the manner hereafter described.

Referring to Fig. 2, it is apparent that there are transverse outlets 69 and 70 which are formed in the side walls of control piston 62 adjacent their ends; and furthermore that the plates 66 and 67 are adapted for control movements relatively to said outlets, such as illustrated in Fig. 6, as compared with the relative positioning of said parts in Fig. 2.

The hollow portions 47' within housing 36, which communicate with the bore 47, are also in communication with the hollow portions 71 and 72 into which fluid pressure is alternately transmitted by movement of the vanes 17 and 18 through the ports 73 and 74.

Transverse openings 75 in housing 36 provide a means of securing the shock absorber housing to the vehicle frame. Normally, for this purpose there are provided at least four such openings, two of which are illustrated in Fig. 2.

Referring to Fig. 3, there is shown an annular opening 76 within the plate 31 in communication with the passage 77, and passage 77 in turn communicates with a registering passage 78 formed in the upper portion of housing 36 whereby excess oil seepage may be returned to reservoir 40.

Operation

Figure 4:
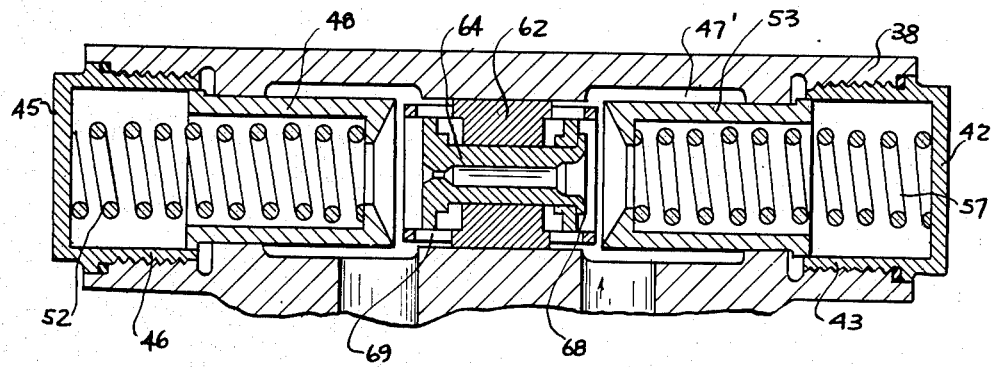
Fig. 4 is a fragmentary elevational section similar to Fig. 2 illustrating the relationship of the relief valve and other parts when the suspension is in equilibrium.

In operation the neutral position of equilibrium is illustrated in Figs. 2 and 4 wherein it appears that control piston 62 is spaced intermediate the inner ends of pistons 48 and 53, it being understood that the shock absorber housing is completely full of fluid.

Upon movement of the vehicle over a road, a surface irregularity will cause a movement of the vehicle suspension in one direction or the other from its position of equilibrium. In view of the connection of the lever 11 with the suspension and with the shaft 15 it is contemplated that such movements from equilibrium will effect rotary movements or rocking movements of the fluid moving means or vanes 17 and 18 with respect to the stationary vanes 22 and 23.

For illustration, assuming the movement of the suspension is such as to cause a counter-clockwise rotation of the vanes 17 and 18 as indicated by the arrow in Fig. 2, then in that case the fluid in chamber 25 will be moved through port 73 into passageway 71 due to the pressure exerted upon it by the moving vanes 17 and 18 inasmuch as chambers 25 and 27 are interconnected by passageway 28.

Fluid in passageway 71 can pass through the space between control piston 62 and piston 53 and also pass through port 70 of control piston 62. In view of the aperture 55 in piston 53, the pressure of the fluid in passageway 71 may be transmitted to the interior of piston 53, however it is apparent that said piston will remain stationary. As the fluid passing through port 70 as well as between the pistons 62 and 53, will be upon opposite sides of the check valve plate or control piston 67, it is apparent that the net moving force of said fluid upon piston 62 will be throughout the cross-sectional area of check valve 64 and will cause control piston 62 to move to the left as shown in Fig. 5.

As control piston 62 moves to the left in response to movement of the vehicle suspension away from its position of equilibrium, it is contemplated as an important part of the present invention, that there be a minimum resistance to the displacement of the fluid upon the left side of control piston 62. It is contemplated that said fluid will be directed through passageway 72 from either between piston 62 and piston 48, or through the ports 69 so that as indicated by the arrow in Fig. 5, the displaced fluid will be moved with a minimum of resistance through passageway 72 and into the central chamber or communicating chambers 24 and 26. It is apparent that upon such rotation of the vanes 17 and 18 that chambers 25 and 27 will be reduced in volume, whereas chambers 24 and 26 will be increased in volume to thereby receive the displaced fluid from passageway 72.

It is contemplated furthermore as an important part of the present invention that this relatively free movement away from equilibrium will be building up the forces which will eventually retard or restrict the return flow of fluid through passageway 72 as the suspension returns to its position of equilibrium.

To avoid shock and to provide for the maximum comfort it is contemplated that the recoil of the suspension back to its position of equilibrium will be yieldably resisted with a decreasing force as said suspension returns to equilibrium so that just prior to the return to equilibrium, the force will be zero.

This is accomplished in the present construction by the compression of the spring 52 within the moved piston 48. While piston 62 is spaced from piston 48 in Figs. 2 and 4, it is apparent from Fig. 5 that on movement to the left control piston 62 engages piston 48 so that piston 48 is moved to the left as in Fig. 5 from the neutral position shown in Figs. 2 and 4. This movement has gradually compressed spring 52 to thereby provide an increased pressure contact of piston 48 with control piston 62; and the fluid, however, will flow through ports 69 and also through port 74 into chamber 24. Fig. 5 illustrates therefore the relationship of the moved piston 48 and the control piston 62 with respect to the valve 64.

As piston 62 moves to the left there may also be some flow between the end of piston 62 and moved piston 48, however, this flow through passageway 72 is with a minimum of restriction.

Upon completion of the movement of the suspension away from equilibrium vanes 17 and 18 will have stopped moving. The recoil of the spring suspension tending to return the same back to its position of equilibrium will produce a clockwise rotation of the fluid moving elements or vanes 17 and 18 reducing the size of chambers 24 and 26 and increasing the size of chambers 25 and 27. Thus there will be a return flow of fluid from chamber 24 through port 74 and through passageway 72 and this fluid, as indicated by the arrow in Fig. 6, exerts pressure through ports 69, maintaining the control piston 68 against one side of the ports 69 closing off the passage of flow to the space between pistons 62 and 48.

Referring to Fig. 6, it will be seen that the diameter of piston 48 is slightly greater than the diameter of the left end portion of control piston 62 to thereby define an annular pressure area 79 against which this return flow of fluid can act tending to move piston 48 to the left of piston 62 providing the space therebetween shown in Fig. 6. This will permit the flow of return fluid into the space between pistons 48 and 62 so as to cause a return movement to the right of piston 62 corresponding to the restricted return of the suspension back to its position of equilibrium.

Thus the present mechanism provides a yielding resistance to this reverse flow of fluid to thereby control the recoil of the vehicle suspension. It is apparent that as the piston 62 moves to the right, the compression of spring 52 will be gradually reduced, consequently the pressure contact between pistons 48 and 62 will be reduced so that there is a decreasing resistance to this return flow of fluid between piston 62 and piston 48.

It therefore follows that this yielding resistance will gradually decrease until control piston 62 has almost returned to its neutral position at which time the resistance is zero as the parts will have assumed a relative position as shown in Figs. 2 and 4.

It is contemplated as an essential part of the present invention that this yielding resistance to the return flow of fluid be decreased to zero before the control piston 62, as well as the vehicle suspension has reached its position of equilibrium so that at equilibrium there is zero resistance to movement of the suspension away from the position of equilibrium.

Thus, the apparatus above described carries out the purposes of the present invention in providing a minimum resistance to movement of the vehicle suspension away from its position of equilibrium. However, the flow of fluid during this movement is adaped to build up the forces which will control and yieldably restrict the recoil of the vehicle suspension when it returns to equilibrium. It is furthermore contemplated that this yielding resistance or control of the recoil will be gradually reduced, as it is apparent from Figs. 2 and 4 that the compression in spring 52 is gradually reduced as the control piston 62 goes to the right.

The reverse operation takes place if the initial deflection of the suspension from equilibrium is in the opposite direction from that above described as this will cause a clockwise rotary movement of the fluid moving means or vanes 17 and 18.

In this case fluid will be moved under pressure through port 74 and passageway 72 causing movement to the right of control piston 62, and a similar spring compressing movement of piston 53. Flow on the opposite side of control piston 62 will pass through port 70, passageway 71 and port 73 into chamber 25; and this flow will be relatively unobstructed. Upon the return of the suspension towards equilibrium, the flow is reversed, but now there is provided a yielding resistance to the return flow due to the pressure of contact between the control piston 62 and piston 53. Of course, there will be the same difference in diameter between piston 62 and piston 53 to provide an annular pressure area on piston 53 which corresponds to the pressure area 79 shown in Figs. 5 and 6, but which will then be upon the opposite side of control piston 62.

In the manner above described, it is apparent also that the recoil of the suspension is thereby controlled and yieldably restricted and furthermore that this resistance gradually decreases as does the compression in spring 57 upon the return movement of control piston 62 towards its central position. Furthermore this resistance will be zero prior to return of the suspension to equilibrium, for the same reasons above given.

Having described my invention, reference should now be had to the claims which follow for determining the scope thereof.

I claim:

1. In a hydraulic shock absorber having a housing and a rockable fluid moving means therein joined to the spring suspension of a vehicle, said housing being formed with a central fluid chamber for said fluid moving means and a transverse bore forming a pair of spaced opposed cylinders, and with two fluid passages respectively connecting the central chamber with said cylinders, an apertured reciprocal recoil control piston within each cylinder, a spring in each cylinder normally urging said pistons toward each other, said fluid moving means adapted to alternately direct fluid into one of said passages on movement of said suspension in one direction away from equilibrium, a control piston in said bore spaced intermediate said pistons, and a fluid flow restrictor valve adjustably movable within said control piston, said restrictor valve being longitudinally apertured, said control piston being adapted for longitudinal movement responsive to the fluid in said one passage freely displacing fluid through the other passage to said central chamber and operatively engaging and moving the piston corresponding to said other passage compressing its spring to increase the contact pressure of said control piston with said moved piston, the diameter of said control piston being less than the diameter of said moved piston thereby defining an overlapping pressure area responsive to and yieldably resisting the reverse flow of fluid in said second passage on return of said suspension towards equilibrium in proportion to the compression of the spring bearing on said moved piston.

2. In a hydraulic shock absorber having a housing and a rockable fluid moving means therein joined to the spring suspension of a vehicle, said housing being formed with a central fluid chamber for said fluid moving means and a transverse bore forming a pair of spaced opposed cylinders, and with two fluid passages respectively connecting the central chamber with said cylinders, an apertured reciprocal recoil control piston within each cylinder, a spring in each cylinder normally urging said pistons toward each other, said fluid moving means adapted to alternately direct fluid into one of said passages on movement of said suspension in one direction away from equilibrium, a control piston in said bore spaced intermediate said pistons, and a fluid flow restrictor valve adjustably movable within said control piston, said control piston being adapted for longitudinal movement responsive to the fluid in said one passage freely displacing fluid through the other passage to said central chamber and operatively engaging and moving the piston corresponding to said other passage compressing its spring to increase the contact pressure of said control piston with said moved piston, the diameter of said control piston being less than the diameter of said moved piston thereby defining an overlapping pressure area responsive to and yieldably resisting the reverse flow of fluid in said second passage on return of said suspension towards equilibrium in proportion to the compression of the spring bearing on said moved piston, said restrictor valve having a restricted longitudinal passage therethrough for equalizing the pressure on opposite sides of said control piston while said suspension is in a position of equilibrium corresponding to a particular load.

3. In a hydraulic shock absorber having a housing and a rockable fluid moving means therein joined to the spring suspension of a vehicle, said housing being formed with a central fluid chamber for said fluid moving means and a transverse bore forming a pair of spaced opposed cylinders, and with two fluid passages respectively connecting the central chamber with said cylinders, an apertured reciprocal recoil control piston within each cylinder, a spring in each cylinder normally urging said pistons toward each other, said fluid moving means adapted to alternately direct fluid into one of said passages on movement of said suspension in one direction away from equilibrium, a control piston in said bore spaced intermediate said pistons, a fluid flow restrictor valve adjustably movable within said control piston, said restrictor valve being longitudinally apertured to permit a balance of fluid pressure in said cylinders when said suspension is in equilibrium, said control piston being adapted for longitudinal movement responsive to the fluid in said one passage freely displacing fluid through the other passage to said central chamber and operatively engaging and moving the piston corresponding to said other passage compressing its spring to increase the contact pressure of said control piston with said moved piston, the diameter of said control piston being less than the diameter of said moved piston thereby defining an overlapping pressure area responsive to and yieldably resisting the reverse flow of fluid in said second passage on return of said suspension towards equilibrium in proportion to the compression of the spring bearing on said moved piston, said control piston having aligned cylindrical openings at its opposite ends and lateral fluid ports in the piston walls joining said openings, and spaced control pistons on opposite ends of said restrictor valve movable within said cylindrical openings for controlling the flow of fluid to and from said passages through said ports.

4. In a hydraulic shock absorber having a housing and a rockable fluid moving means therein joined to the spring suspension of a vehicle, said housing being formed with a central fluid chamber for said fluid moving means and a transverse bore forming a pair of spaced opposed cylinders, and with two fluid passages respectively connecting the central chamber with said cylinders, an apertured reciprocal recoil control piston within each cylinder, a spring in each cylinder normally urging said pistons toward each other, said fluid moving means adapted to alternately direct fluid into one of said passages on movement of said suspension in one direction away from equilibrium, a control piston in said bore spaced intermediate said pistons, and a fluid flow restrictor valve adjustably movable within said control piston, said restrictor valve being longitudinally apertured to permit a balance of fluid pressure in said cylinders when said suspension is in equilibrium, said control piston being adapted for longitudinal movement responsive to the fluid in said one passage freely displacing fluid through the other passage to said central chamber and operatively engaging and moving the piston corresponding to said other passage compressing its spring to increase the contact pressure of said control piston with said moved piston, the diameter of said control piston being less than the diameter of said moved piston thereby defining an overlapping pressure area responsive to and yieldably resisting the reverse flow of fluid in said second passage on return of said suspension towards equilibrium in proportion to the compression of the spring bearing on said moved piston, said fluid moving means being adapted to direct fluid into the other of said passages on movement of said suspension in the opposite direction away from equilibrium.

5. In a hydraulic shock absorber having a housing and a rockable fluid moving means therein joined to the spring suspension of a vehicle, said housing being formed with a central fluid chamber for said fluid moving means and a transverse bore forming a pair of spaced opposed cylinders, and with two fluid passages respectively connecting the central chamber with said cylinders, an apertured reciprocal recoil control piston within each cylinder, a spring in each cylinder normally urging said pistons toward each other, said fluid moving means adapted to alternately direct fluid into one of said passages on movement of said suspension in one direction away from equilibrium, a control piston in said bore spaced intermediate said pistons, a fluid flow restrictor valve adjustably movable within said control piston, said control piston being adapted for longitudinal movement responsive to the fluid in said one passage freely displacing fluid through the other passage to said central chamber and operatively engaging and moving the piston corresponding to said other passage compressing its spring to increase the contact pressure of said control piston with said moved piston, the diameter of said control piston being less than the diameter of said moved piston thereby defining an overlapping pressure area responsive to and yieldably resisting the reverse flow of fluid in said second passage on return of said suspension towards equilibrium in proportion to the compression of the spring bearing on said moved piston, and caps threaded into the opposite outer ends of said bore for closing said cylinders and for regulating the initial compression of said springs.

6. In a hydraulic shock absorber having a housing and a rockable fluid moving means therein joined to the spring suspension of a vehicle, said housing being formed with a central fluid chamber for said fluid moving means and a transverse bore forming a pair of spaced opposed cylinders, and with two fluid passages respectively connecting the central chamber with said cylinders, an apertured reciprocal recoil control piston within each cylinder, a spring in each cylinder normally urging said pistons toward each other, said fluid moving means adapted to alternately direct fluid into one of said passages on movement of said suspension in one direction away from equilibrium, a control piston in said bore spaced intermediate said pistons, and a fluid flow restrictor valve adjustably movable within said control piston, said control piston being adapted for longitudinal movement responsive to the fluid in said one passage freely displacing fluid through the other passage to said central chamber and operatively engaging and moving the piston corresponding to said other passage compressing its spring to increase the contact pressure of said control piston with said moved piston, the diameter of said control piston being less than the diameter of said moved piston thereby defining an overlapping pressure area responsive to and yieldably resisting the reverse flow of fluid in said second passage on return of said suspension towards equilibrium in proportion to the compression of the spring bearing on said moved piston, the reverse flow in said second passage gradually returning said control piston to its initial central position thereby reducing the compression of said spring on said moved piston so as to gradually decrease the resistance to said return flow resulting in a gradually decreasing resistance to recoil of said suspension back to equilibrium.

7. In a hydraulic shock absorber having a housing and a rockable fluid moving means therein joined to the spring suspension of a vehicle, said housing being formed with a central fluid chamber for said fluid moving means and a transverse bore forming a pair of spaced opposed cylinders, and with two fluid passages respectively connecting the central chamber with said cylinders, an apertured reciprocal recoil control piston within each cylinder, a spring in each cylinder normally urging said pistons toward each other, said fluid moving means adapted to alternately direct fluid into one of said passages on movement of said suspension in one direction away from equilibrium, a control piston in said bore spaced intermediate said pistons, a fluid flow restrictor valve adjustably movable within said control piston, said control piston being adapted for longitudinal movement responsive to the fluid in said one passage freely displacing fluid through the other passage to said central chamber and operatively engaging and moving the piston corresponding to said other passage compressing its spring to increase the contact pressure of said control piston with said moved piston, the diameter of said control piston being less than the diameter of said moved piston thereby defining an overlapping pressure area responsive to and yieldably resisting of the reverse flow of fluid in said second passage on return of said suspension towards equilibrium in proportion to the compression of the spring bearing on said moved piston, and a pair of spaced opposed stationary vanes in said central fluid chamber, said fluid moving means including a pair of oppositely directed vanes spaced from said first vanes and adapted on rotary movement to effect flow through said passages from and to said central chamber.

8. In a hydraulic shock absorber having a housing and a rockable fluid moving means therein joined to the spring suspension of a vehicle, said housing being formed with a central fluid chamber for said fluid moving means and a transverse bore forming a pair of spaced opposed cylinders, and with two fluid passages respectively connecting the central chamber with said cylinders, an apertured reciprocal recoil control piston within each cylinder, a spring in each cylinder normally urging said pistons toward each other, said fluid moving means adapted to alternately direct fluid into one of said passages on movement of said suspension in one direction away from equilibrium, a control piston in said bore spaced intermediate said pistons, a fluid flow restrictor valve adjustably movable within said control piston, said control piston being adapted for longitudinal movement responsive to the fluid in said one passage freely displacing fluid through the other passage to said central chamber and operatively engaging and moving the piston corresponding to said other passage compressing its spring to increase the contact pressure of said control piston with said moved piston, the diameter of said control piston being less than the diameter of said moved piston thereby defining an overlapping pressure area responsive to and yieldably resisting the reverse flow of fluid in said second passage on return of said suspension towards equilibrium in proportion to the compression of the spring bearing on said moved piston, said fluid moving means including a shaft projecting from said housing, and a lever joined at one end to said shaft and joined at its other end to said suspension.

9. In a hydraulic shock absorber having a housing and fluid moving means therein joined to the spring suspension of a vehicle, said housing being formed with a fluid chamber for said fluid moving means, a second fluid chamber, and fluid passageways interconnecting portions of said first chamber with two spaced portions of said second fluid chamber, a movable fluid flow restrictor valve control element in said second chamber responsive to the flow in one direction from said first chamber through one of said passageways upon movement of said suspension from equilibrium, and with a substantially non-restricted flow of fluid through the other passageway back to said first chamber, a secondary control means engageable by said control element and movably responsive to its movement, and a compressive element retainingly engaging said secondary control means, whereby upon movement of said restrictor valve control element, said compressive element is compressed so that said secondary control means compressively engages said restrictor valve control element, building up a force between said restrictor valve control element and said secondary control means to yieldably and decreasingly restrict the return secondary flow of fluid through said second passageway as said suspension returns to its initial position of equilibrium, whereby fluid displacement by primary movement of said suspension actuates the resistance necessary to restrict secondary flow of fluid to effectively restrict recoil of said suspension back to equilibrium.

10. In a hydraulic shock absorber having a housing and a rockable fluid moving means therein joined to the spring suspension of a vehicle, said housing being formed with a central fluid chamber for said fluid moving means and a transverse bore forming a pair of spaced opposed cylinders, and with two fluid passages respectively connecting the central chamber with said cylinders, an apertured reciprocal recoil control piston within each cylinder, a spring in each cylinder normally urging said pistons toward each other, said fluid moving means adapted to alternately direct fluid into one of said passages on movement of said suspension in one direction away from equilibrium, a control piston in said bore spaced intermediate said pistons, and a fluid flow restrictor valve adjustably movable within said control piston, said control piston being adapted for longitudinal movement responsive to the fluid in said one passage freely displacing fluid through the other passage to said central chamber and operatively engaging and moving the piston corresponding to said other passage compressing its spring to increase the contact pressure of said control piston with said moved piston, the diameter of said control piston being less than the diameter of said moved piston thereby defining an overlapping pressure area responsive to and yieldably resisting the reverse flow of fluid in said second passage on return of said suspension towards equilibrium in proportion to the compression of the spring bearing on said moved piston, whereby fluid displacement by primary movement of said suspension actuates the resistance necessary to restrict secondary flow of fluid to effectively restrict recoil of said suspension back to equilibrium.

References Cited in the file of this patent

UNITED STATES PATENTS

| Number | Name | Date |
|---|---|---|
| 2,559,968 | Katz | July 10, 1951 |
| 2,604,953 | Campbell | July 29, 1952 |
| 2,605,861 | De Loe | Aug. 5, 1952 |